(12) United States Patent
Zhang et al.

(10) Patent No.: US 12,277,486 B2
(45) Date of Patent: Apr. 15, 2025

(54) DEFECT LOCATION METHOD AND DEVICE BASED ON COVERAGE INFORMATION

(71) Applicant: PEKING UNIVERSITY, Beijing (CN)

(72) Inventors: Lu Zhang, Beijing (CN); Yiling Lou, Beijing (CN); Qihao Zhu, Beijing (CN); Jinhao Dong, Beijing (CN); Zeyu Sun, Beijing (CN); Dan Hao, Beijing (CN)

(73) Assignee: Peking University, Beijing (CN)

( * ) Notice: Subject to any disclaimer, the term of this patent is extended or adjusted under 35 U.S.C. 154(b) by 909 days.

(21) Appl. No.: 17/407,752

(22) Filed: Aug. 20, 2021

(65) Prior Publication Data

US 2022/0391663 A1 Dec. 8, 2022

(30) Foreign Application Priority Data

Jun. 2, 2021 (CN) .......................... 202110616324.8

(51) Int. Cl.
*G06N 20/00* (2019.01)
*G06N 3/04* (2023.01)

(52) U.S. Cl.
CPC ............... *G06N 3/04* (2013.01); *G06N 20/00* (2019.01)

(58) Field of Classification Search
None
See application file for complete search history.

(56) References Cited

U.S. PATENT DOCUMENTS

2015/0378874 A1* 12/2015 Prasad ................ G06F 11/3692
717/124

FOREIGN PATENT DOCUMENTS

| CN | 106445801 | A | * | 2/2017 | .......... G06F 11/3612 |
| CN | 109471793 | A | * | 3/2019 | .......... G06F 11/3684 |
| CN | 111831541 | A | * | 10/2020 | .......... G06F 11/3636 |
| CN | 112965894 | A | * | 6/2021 | ............ G06F 11/362 |

* cited by examiner

*Primary Examiner* — Xuyang Xia
(74) *Attorney, Agent, or Firm* — Oliff PLC

(57) ABSTRACT

The present disclosure discloses a defect location method and device based on coverage information, the method including: characterizing program structure information and test case coverage information of a target program in a graph to obtain a graph-characterized structure; generating a node attribute sequence and an adjacency matrix based on the graph-characterized structure; and inputting the node attribute sequence and the adjacency matrix to a trained graph neural network model, so that the graph neural network model outputs a suspicious degree list of the target program based on the node attribute sequence and the adjacency matrix. Through the graph-based unified information characterization, the coverage information can be saved without loss and compression, and the structure information may also be considered, thereby improving the accuracy of defect location.

6 Claims, 3 Drawing Sheets

DEFECT LOCATION METHOD AND DEVICE BASED ON COVERAGE INFORMATION

TECHNICAL FIELD

The present disclosure relates to the technical field of software testing, and in particular to a defect location method and a defect location device based on coverage information.

BACKGROUND

In defect location, program codes and corresponding sets of test cases (including at least one failed test case) are input, a list of program code segments arranged in descending order of suspicious degree (probability of error) is output, and a programmer checks each program from top to bottom in sequence according to the output list of the defect location to quickly find out wrong code segments. Currently, a defect location technology based on coverage information is often used. The coverage information refers to execution of test cases on each program segment. If program statement B is executed by test case A, it is considered that B is covered by A.

In related technologies, the defect location technology based on coverage information includes two types, i.e., defect location based on coverage information using frequency spectrum, and defect location based on coverage information using learning. However, these types of specific defect location technologies all have a problem of losing details of coverage information during the processing, which results in a low accuracy of location.

SUMMARY

In view of the above shortcomings of the prior art, an object of the present disclosure is to provide a defect location method and a defect location device based on coverage information, and the object is achieved through the following technical solutions.

A first aspect of the present disclosure proposes a defect location method based on coverage information, which includes:
  characterizing program structure information and test case coverage information of a target program in a graph to obtain a graph-characterized structure;
  generating a node attribute sequence and an adjacency matrix based on the graph-characterized structure; and
  inputting the node attribute sequence and the adjacency matrix to a trained graph neural network model, so that the graph neural network model outputs a suspicious degree list of the target program based on the node attribute sequence and the adjacency matrix.

A second aspect of the present disclosure proposes a defect location device based on coverage information, which includes:
  a graph-characterized module, which is configured to characterize program structure information and test case coverage information of a target program in a graph to obtain a graph-characterized structure;
  a model input generation module, which is configured to generate a node attribute sequence and an adjacency matrix based on the graph-characterized structure; and
  a defect location module, which is configured to input the node attribute sequence and the adjacency matrix to a trained graph neural network model, so that the graph neural network model outputs a suspicious degree list of the target program based on the node attribute sequence and the adjacency matrix.

Based on the defect location method and device based on coverage information described in the first and second aspects, the present disclosure has the following advantageous effects or benefits.

By fully characterizing the program structure information and test case coverage information of the target program in a graph, the coverage information can be saved without loss and compression, so that the accuracy of subsequent defect location can be improved. The traditional ranking learning model compresses the graph and then learns, which results in loss of information, whereas the present disclosure uses the graph neural network model to better process non-Euclidean data, namely, the graph-characterized structure, which can achieve the object of improving the accuracy of defect location.

BRIEF DESCRIPTION OF THE DRAWINGS

The accompanying drawings described herein are used to provide a further understanding of the present disclosure, and they constitute a part of the present disclosure. Exemplary embodiments of the present disclosure and the description thereof are used to explain the present disclosure, and do not impose improper limitations to the present disclosure. In the drawings.

DETAILED DESCRIPTION

Figure 1:
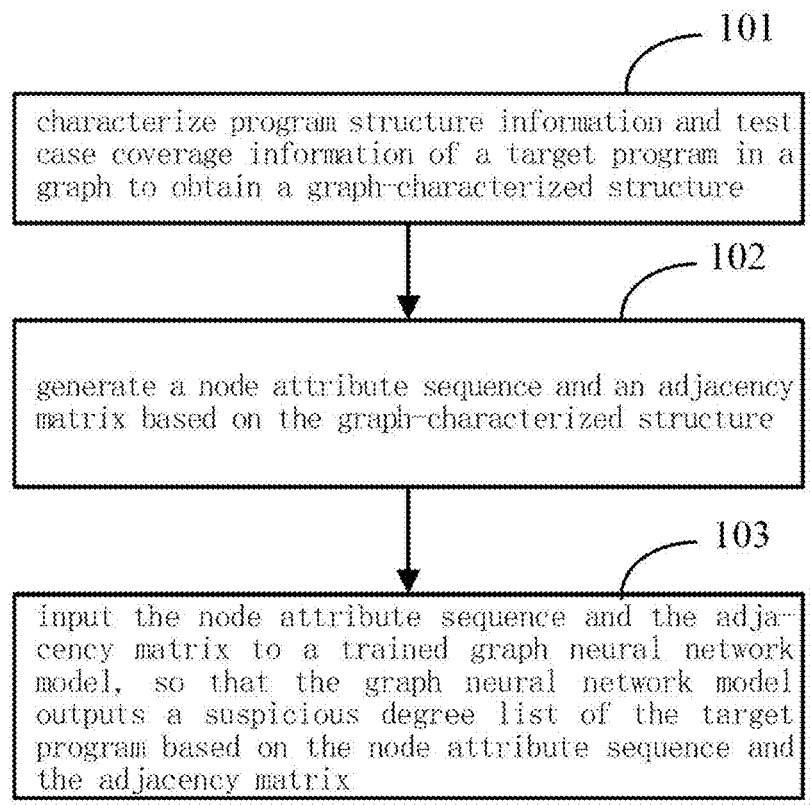
FIG. 1 is a flowchart of an embodiment of a defect location method based on coverage information shown according to an exemplary embodiment of the present disclosure.

The exemplary embodiments will be described in detail herein, and examples thereof are shown in the accompanying drawings. When the following description involves the drawings, the same numbers in different drawings indicate the same or similar elements, unless otherwise indicated. The implementations described in the following exemplary embodiments do not represent all the implementations consistent with the present disclosure. On the contrary, they are merely examples of devices and methods consistent with some aspects of the present disclosure as set forth in detail in the appended claims.

Terms used in the present disclosure are only for the purpose of describing specific embodiments, and are not intended to limit the present disclosure. The singular forms of "a", "said" and "the" used in the present disclosure and the appended claims are also intended to include plural forms, unless the context clearly indicates other meanings. It should also be understood that the term "and/or" as used herein refers to and includes any or all possible combinations of one or more associated listed items.

It should be understood that although the terms first, second, third and the like may be used in the present disclosure to describe various information, the information should not be limited by these terms. These terms are only used to distinguish the same type of information from each other. For example, without departing from the scope of the present disclosure, first information may also be referred to as second information, and similarly, second information may also be referred to as first information. Depending on the context, the word "if" as used herein may be interpreted as "when . . . " or "at the time of . . . " or "determined in response to . . . ".

In the prior art, the defect location technology based on coverage information using frequency spectrum has the following defects.

(1) The coverage information is compressed, and the number of passed/failed test cases is used to represent the coverage information, which will lead to loss of details of the coverage information, resulting in a low accuracy of location.

(2) Only the coverage information is considered, and structure information of the program code itself is not considered. Therefore, it is impossible to distinguish the suspicious degree between program code segments with similar coverage information, resulting in a low accuracy of location.

The defect location based on coverage information using learning includes defect location technology based on coverage information using characterization learning and defect location technology based on coverage information using combined learning, but these two technologies also have certain drawbacks.

The defect location technology based on coverage information using characterization learning has the following drawbacks: isolated Boolean vectors are used to independently characterize the coverage information of each test case, which will also lead to loss of details of the coverage information, resulting in a low accuracy of location.

The defect location technology based on coverage information using combined learning has the following drawbacks: this type of technology directly uses an output of the defect location technology based on coverage information using frequency spectrum as an input feature of the learning model, which essentially faces the same defect of incomplete coverage information characterization as the defect location technology based on coverage information using frequency spectrum, that is, the number of passed/failed test cases is used to represent the coverage information, which will lead to loss of details of the coverage information, resulting in a low accuracy of location.

In summary, the defect location technologies used in the prior art all have the problems of loss of details of the coverage information and low accuracy of location.

In order to solve the above technical problems, the present disclosure proposes an improved defect location method based on coverage information, in which program structure information and test case coverage information of a target program are characterized in a graph to obtain a graph-characterized structure, and a node attribute sequence and an adjacency matrix are generated based on the graph-characterized structure; further, the node attribute sequence and the adjacency matrix are input to a trained graph neural network model, so that the graph neural network model outputs a suspicious degree list of the target program based on the node attribute sequence and the adjacency matrix.

Based on the above description, it can be seen that by fully characterizing the program structure information and test case coverage information of the target program in a graph, the coverage information can be saved without loss and compression, so that the accuracy of subsequent defect location can be improved. The traditional ranking learning model compresses the graph and then learns, which results in loss of information, whereas the present disclosure uses the graph neural network model to better process non-Euclidean data, namely, the graph-characterized structure, which can achieve the object of improving the accuracy of defect location.

The defect location solution proposed by the present disclosure will be described in detail below with reference to specific embodiments.

FIG. 1 is a flowchart of an embodiment of a defect location method based on coverage information shown according to an exemplary embodiment of the present disclosure. The defect location method includes the following steps 101 to 103.

Step 101: characterizing program structure information and test case coverage information of a target program in a graph to obtain a graph-characterized structure.

In an optional specific embodiment, an abstract syntax tree (AST) structure of each function in the target program is obtained as program structure information of the target program. The abstract syntax tree structure includes a plurality of program nodes and attribute information of each program node; then, each test case in the test case coverage information is used as an independent test node, and a graph-characterized structure is further generated based on the abstract syntax tree structure of each function, and a coverage relationship between each test node in the test case coverage information and each program node.

The abstract syntax tree structure, which is the program structure information, characterizes the function at a program statement level.

Specifically, the program nodes in the abstract syntax tree structure have a root node and child nodes. The attribute information of the root node includes the type of the program statement represented by this node, and a text similarity between the program statement represented by the node and a test case covering the program statement; and the attribute information of the child node only includes the type of the program statement represented by this node.

Optionally, the type of the program statement includes function declaration type, if statement type, conditional statement type, then statement type, function call type, and variable declaration type.

Figure 2:
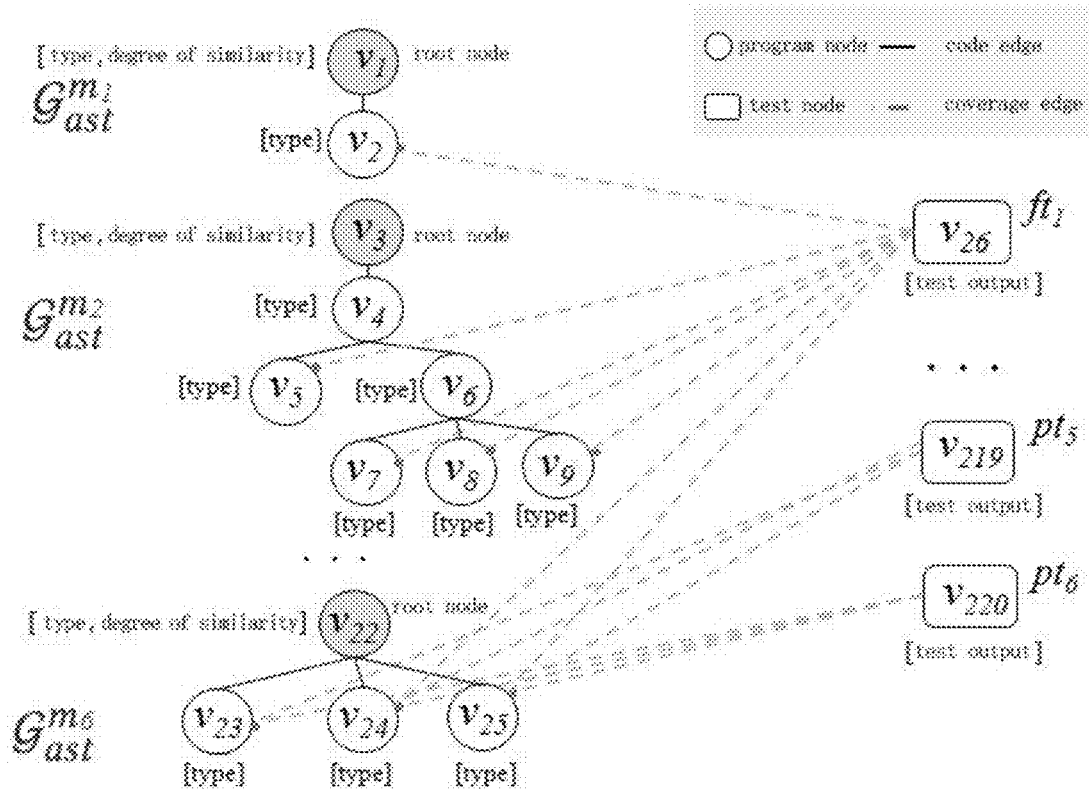
FIG. 2 is a schematic diagram of a graph-characterized structure shown according to an exemplary embodiment of the present disclosure.

For example, as shown in FIG. 2, the target program includes 6 functions: $G_{ast}^{m1}, G_{ast}^{m2} \ldots G_{ast}^{m6}$. It can be seen from FIG. 2 that function $G_{ast}^{m1}$ includes program node $v_1$, program node $v_2$, and the attribute information of each program node, in which program node $v_1$ is the root node, and program node $v_2$ is the child node; function $G_{ast}^{m2}$ includes program node $v_3$ to program node $v_9$, and the attribute information of each program node, in which program node $v_3$ is the root node, and program node $v_4$ to program node $v_9$ are child nodes; and function $G_{ast}^{m6}$ includes program node $v_{22}$ to program node $v_{25}$, and the attribute information of each program node, in which program node $v_{22}$ is the root node, and program node $v_{23}$ to program node $v_{25}$ are the child nodes. The connecting line (black solid line) between the program node and the program node represents a code edge.

The test nodes include $v_{26}$~$v_{220}$. ft represents the test case that failed the test, pt represents the test case that passed the test, and the connecting line (dashed line) between the test node and the program node represents the coverage information of the test case, namely, a coverage edge. For example, if test node $v_{26}$ and program node $v_2$ are connected, it means that the failed test case ft1 covers the program statement represented by program node $v_2$.

It can be seen from the above FIG. 2 that through the graph-characterized structure, all program structure information and test case coverage information can be characterized in one graph.

It should be noted that in addition to that the program node has the attribute information, the test node also has corresponding attribute information. Specifically, the attribute information of the test node is specifically the attribute indicating that the test case passed the test or the attribute indicating that the test case failed the test.

Step 102: generating a node attribute sequence and an adjacency matrix based on the graph-characterized structure.

In a specific embodiment, a node attribute sequence is generated through the attribute information of the program node contained in the graph-characterized structure and the attribute information of the test node, and an adjacency matrix is generated through the relationship between the program node contained in the graph-characterized structure and the program node, and the relationship between the program node and the test node.

Figure 3:
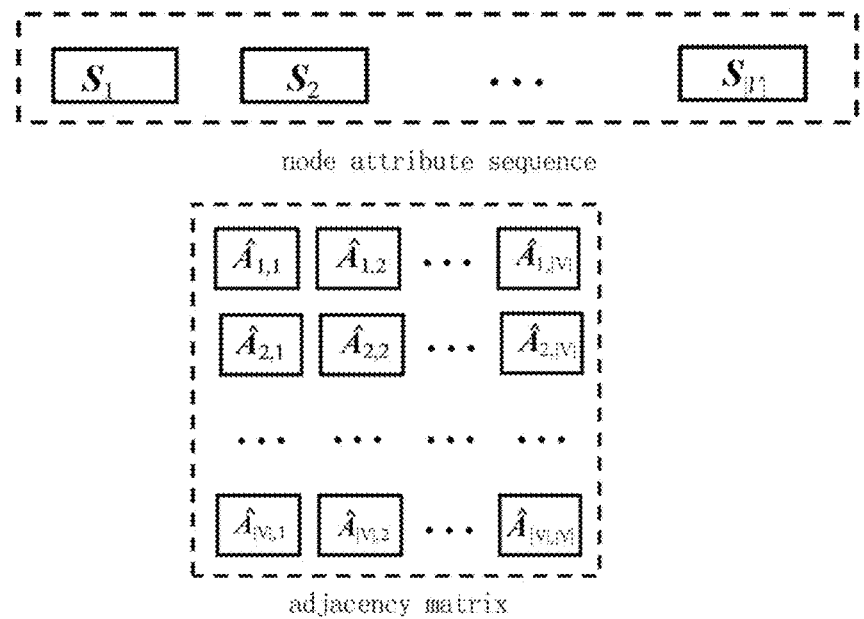
FIG. 3 is a schematic diagram of a node attribute sequence and an adjacency matrix shown according to an exemplary embodiment of the present disclosure.

As shown in FIG. 3, it is supposed that the graph-characterized structure G=<V, E>, where V represents the set of program nodes and test nodes, and E represents the set of code edges and coverage edges. It can be seen from FIG. 3 that the node attribute sequence contains the attribute information of each node, that is, S1 represents the attribute information of the first node, S2 represents the attribute information of the second node, and so on, S|v| represents the attribute information of the $v^{th}$ node in the set. Each element in the adjacency matrix represents the relationship between two different nodes; for example, A1,1 represents the connection relationship between the first node and the first node, and A|V|,2 represents the connection relationship between the $v^{th}$ node and the second node. If there are code edges or coverage edges between two different nodes, the value of the element representing the two nodes in the adjacency matrix is 1, otherwise the value is 0.

Step 103: inputting the node attribute sequence and the adjacency matrix to a trained graph neural network model, so that the graph neural network model outputs a suspicious degree list of the target program based on the node attribute sequence and the adjacency matrix.

Figure 4:
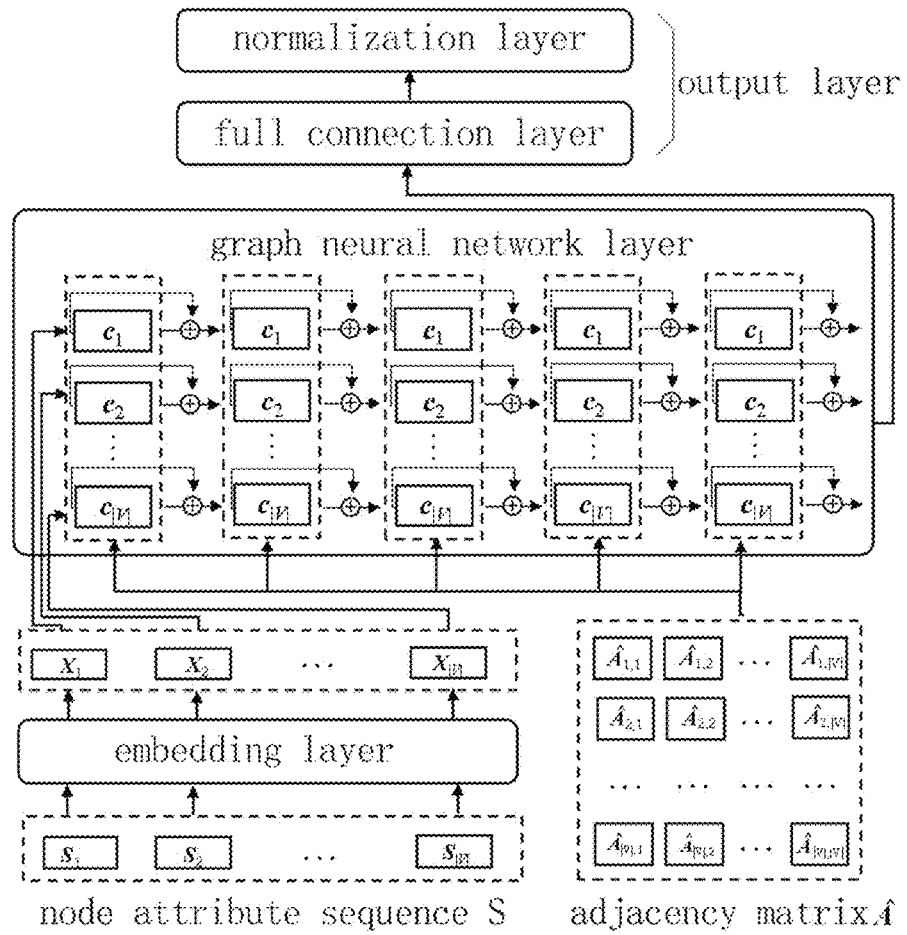
FIG. 4 is a schematic structural diagram of a graph neural network model shown according to an exemplary embodiment of the present disclosure.

In an optional specific embodiment, in the graph neural network model structure shown in FIG. 4, the node attribute sequence S is first converted into a vector sequence X through an embedding layer in the graph neural network model and output the vector sequence X to a graph neural network layer in the graph neural network model; then the graph neural network layer obtains a state value of the program node and a state value of the test node based on the vector sequence X and the adjacency matrix Â, and outputs them to an output layer in the graph neural network model; finally, the output layer obtains the suspicious degree of each function in the target program based on the state value of the program node and the state value of the test node, and generates a suspicious degree list of each function in the order of suspicious degree from high to low.

It should be noted that the graph neural network layer includes a plurality of sub-layers (five sub-layers are shown in FIG. 4), and the number of sub-layers is determined according to the effects of the different numbers of sub-layers in the training process.

A first sub-layer of the graph neural network layer obtains the state value of the program node and the state value of the test node based on the vector sequence X and the adjacency matrix Â. Starting from a second sub-layer, each sub-layer updates the state value of the program node and the state value of the test node based on the output of the previous sub-layer and the adjacency matrix Â.

Optionally, the output layer includes a full connection layer and a normalization layer.

At this point, the process shown in FIG. 1 is completed. By fully characterizing the program structure information and test case coverage information of the target program in a graph, the present disclosure enables the coverage information to be saved without loss and compression, so that the accuracy of subsequent defect location can be improved. The traditional ranking learning model compresses the graph and then learns, which results in loss of information, whereas the present disclosure uses the graph neural network model to better process non-Euclidean data, namely, the graph-characterized structure, which can achieve the object of improving the accuracy of defect location.

Figure 5:
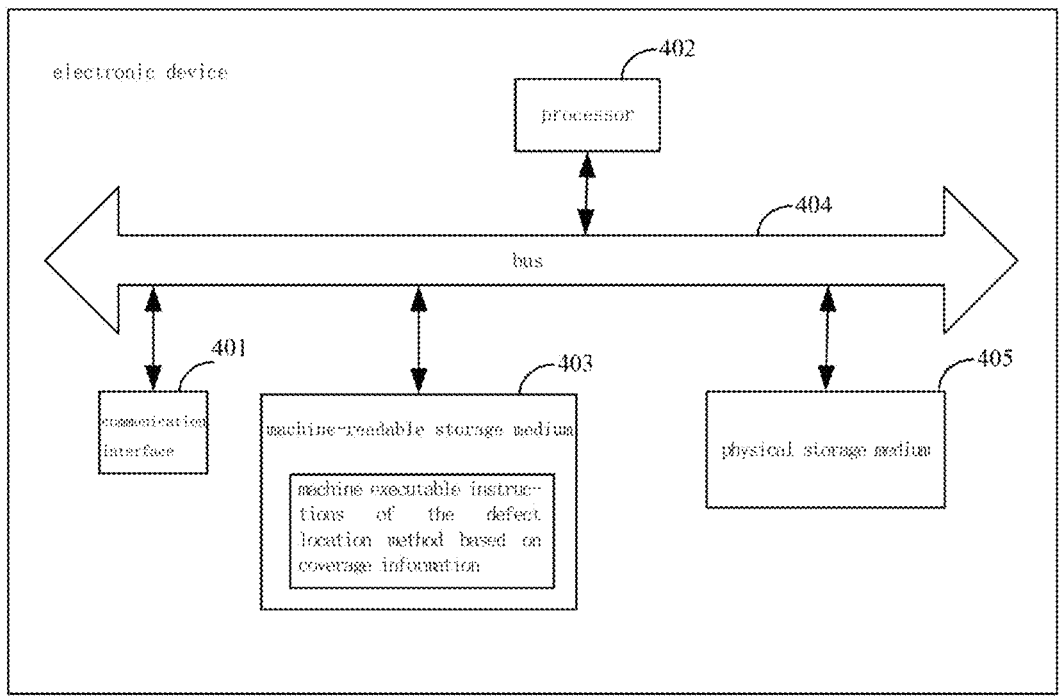
FIG. 5 is a hardware structural diagram of an electronic device shown according to an exemplary embodiment of the present disclosure.

FIG. 5 is a hardware structural diagram of an electronic device shown according to an exemplary embodiment of the present disclosure. The electronic device includes: a communication interface 401, a processor 402, a machine-readable storage medium 403, and a bus 404; the communication interface 401, the processor 402 and the machine-readable storage medium 403 communicate with each other through the bus 404. The processor 402 reads and executes machine executable instructions in the machine-readable storage medium 403 which correspond to the control logic of the defect location method based on coverage information to execute the defect location method based on coverage information as described above. For specific content, reference may be made to the above-mentioned embodiment, and a repeated description is omitted herein.

The machine-readable storage medium 403 mentioned in the present disclosure may be any electronic, magnetic, optical or other physical storage device, and may contain or store information, such as executable instructions, data, and so on. For example, the machine-readable storage medium may be: a volatile memory, a non-volatile memory, or similar storage media. Specifically, the machine-readable storage medium 403 may be a RAM (Random Access Memory), a flash memory, a storage drive (such as hard drive), any type of storage disk (such as optical disk, DVD, etc.), or similar storage media, or a combination thereof.

Corresponding to the foregoing embodiment of the defect location method based on coverage information, the present disclosure also provides an embodiment of a defect location device based on coverage information.

Figure 6:
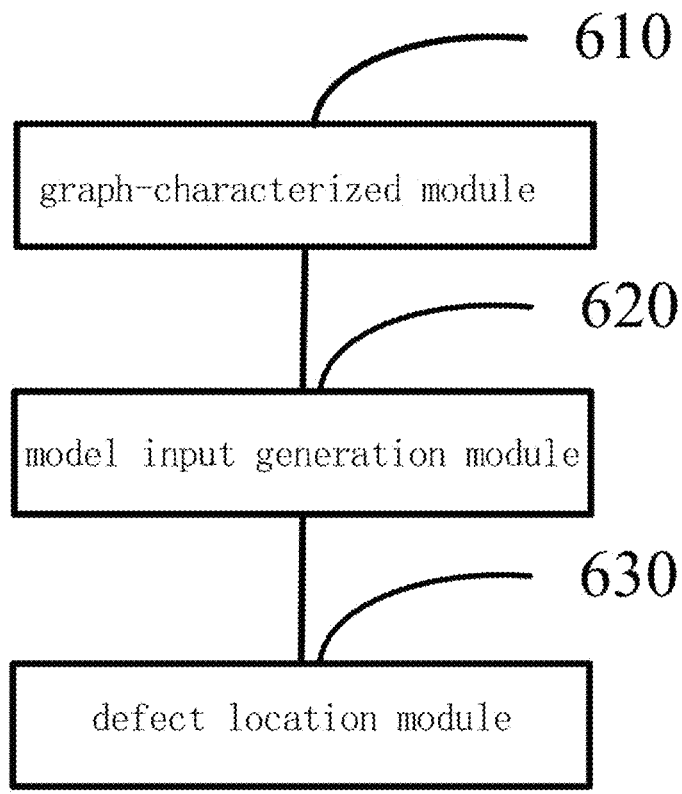
FIG. 6 is a schematic structural diagram of a defect location device based on coverage information shown according to an exemplary embodiment of the present disclosure.

FIG. 6 is a schematic structural diagram of a defect location device based on coverage information shown according to an exemplary embodiment of the present disclosure. The defect location device includes:

a graph-characterized module 610, which is configured to characterize program structure information and test case coverage information of a target program in a graph to obtain a graph-characterized structure;

a model input generation module 620, which is configured to generate a node attribute sequence and an adjacency matrix based on the graph-characterized structure; and a defect location module 630, which is configured to input the node attribute sequence and the adjacency matrix to a trained graph neural network model, so that the graph neural network model outputs a suspicious degree list of the target program based on the node attribute sequence and the adjacency matrix.

In an optional implementation, the graph-characterized module 619 is specifically configured to: obtain an abstract syntax tree structure of each function in the target program as program structure information of the target program, in which the abstract syntax tree structure includes a plurality of program nodes and attribute information of each program node; use each test case in the test case coverage information as an independent test node; and generate a graph-characterized structure based on the abstract syntax tree structure of each function, and a coverage relationship between each test node in the test case coverage information and each program node.

In an optional implementation, the model input generation module 620 is specifically configured to: generate a node attribute sequence based on the attribute information of the program node contained in the graph-characterized structure and the attribute information of the test node, in which the attribute information of the test node is the attribute indicating that the test case passed the test or the attribute indicating that the test case failed the test; and generate an adjacency matrix based on the relationship between the program node contained in the graph-characterized structure and the program node, and the relationship between the program node and the test node.

In an optional implementation, the defect location module 630 is specifically configured to: convert the node attribute sequence into a vector sequence through an embedding layer in the graph neural network model and output the vector sequence to a graph neural network layer in the graph neural network model; enable the graph neural network layer to obtain a state value of the program node and a state value of the test node based on the vector sequence and the adjacency matrix, and output them to an output layer in the graph neural network model; and enable the output layer to obtain the suspicious degree of each function in the target program based on the state value of the program node and the state value of the test node, and generate a suspicious degree list of each function in the order of suspicious degree from high to low.

In an optional implementation, the graph neural network layer includes a plurality of sub-layers; in which a first sub-layer of the graph neural network layer obtains the state value of the program node and the state value of the test node based on the vector sequence and the adjacency matrix. Starting from a second sub-layer, each sub-layer updates the state value of the program node and the state value of the test node based on the output of the previous sub-layer and the adjacency matrix.

For the specific implementation process of the functions and roles of individual units in the above-mentioned device, reference may be made to the implementation process of the corresponding steps in the above-mentioned method for details, and a repeated description is omitted herein.

For the device embodiment, since it basically corresponds to the method embodiment, for relevant parts, reference may be made to the parts of the description of the method embodiment. The device embodiment described above is merely illustrative, the units described as separate components may be or may not be physically separated, and the components displayed as units may be or may not be physical units, that is, they may be located in one place, or they may be distributed over multiple network units. Some or all of the modules may be selected according to actual needs to achieve the objects of the solutions of the present disclosure. Those skilled in the art can understand and implement them without creative work.

Those skilled in the art will easily think of other embodiments of the present disclosure after considering the specification and practicing the present disclosure disclosed herein. The present disclosure is intended to cover any variations, uses or adaptive changes of the present disclosure. These variations, uses or adaptive changes follow the general principles of the present disclosure and include common knowledge or conventional technical means in the technical field that are not disclosed by the present disclosure. The specification and the embodiments should be regarded as exemplary only, and the true scope and spirit of the present disclosure are indicated by the following claims.

It should also be noted that the terms "include", "contain" or any other variants thereof are intended to cover non-exclusive inclusion, so that a process, method, commodity or device including a series of elements not only include those elements, but also include other elements that are not explicitly listed, or they also include elements inherent to such process, method, commodity, or device. If there are no further restrictions, the element defined by the sentence "including a . . . " does not exclude the existence of other identical elements in the process, method, commodity, or device that includes the element.

Described above are only preferred embodiments of the present disclosure and are not intended to limit the present disclosure. Any modifications, equivalent replacements, improvements, etc., made within the spirit and principle of the present disclosure shall be included within the scope of protection of the present disclosure.

The invention claimed is:

1. A defect location method based on coverage information, the method comprising:

characterizing program structure information and test case coverage information of a target program in a graph to obtain a graph-characterized structure;

generating a node attribute sequence and an adjacency matrix based on the graph-characterized structure; and inputting the node attribute sequence and the adjacency matrix to a trained graph neural network model, so that the graph neural network model outputs a suspicious degree list of the target program based on the node attribute sequence and the adjacency matrix, wherein the characterizing program structure information and the test case coverage information of the target program in the graph to obtain the graph-characterized structure comprises:

obtaining an abstract syntax tree structure of each function in the target program as the program structure information of the target program, wherein the abstract syntax tree structure comprises a plurality of program nodes and attribute information of each program node;

using each test case in the test case coverage information as an independent test node; and generating the graph-characterized structure based on the abstract syntax tree structure of each function, and a coverage relationship between each test node in the test case coverage information and each program node;

wherein the graph neural network model outputting the suspicious degree list of the target program based on the node attribute sequence and the adjacency matrix comprises:

converting the node attribute sequence into a vector sequence through an embedding layer in the graph neural network model and outputting the vector sequence to a graph neural network layer in the graph neural network model;

obtaining, by the graph neural network layer, a state value of the program node and a state value of the test node based on the vector sequence and the adjacency matrix, and outputting them to an output layer in the graph neural network model by the graph neural network layer; and obtaining, by the output layer, the suspicious degree of each function in the target program based on the state value of the program node and the state value of the test node, and generating, by the output layer, the suspicious degree list of each function in an order of suspicious degree from high to low.

2. The defect location method according to claim 1, wherein the generating the node attribute sequence and the adjacency matrix based on the graph-characterized structure comprises:

generating the node attribute sequence based on the attribute information of the program node contained in the graph-characterized structure and the attribute information of the test node, wherein the attribute information of the test node is the attribute indicating that the test case passed the test or the attribute indicating that the test case failed the test; and generating the adjacency matrix based on the coverage relationship between the program node contained in the graph-characterized structure and the program node, and the coverage relationship between the program node and the test node.

3. The defect location method according to claim 1, wherein the graph neural network layer comprises a plurality of sub-layers; and wherein a first sub-layer of the graph neural network layer obtains the state value of the program node and the state value of the test node based on the vector sequence and the adjacency matrix, and starting from a second sub-layer, each sub-layer updates the state value of the program node and the state value of the test node based on the output of the previous sub-layer and the adjacency matrix.

4. A defect location device based on coverage information, the device comprising:

a graph-characterized module, which is configured to characterize program structure information and test case coverage information of a target program in a graph to obtain a graph-characterized structure;

a model input generation module, which is configured to generate a node attribute sequence and an adjacency matrix based on the graph-characterized structure; and a defect location module, which is configured to input the node attribute sequence and the adjacency matrix to a trained graph neural network model, so that the graph neural network model outputs a suspicious degree list of the target program based on the node attribute sequence and the adjacency matrix, wherein the graph-characterized module is specifically configured to:

obtain an abstract syntax tree structure of each function in the target program as the program structure information of the target program, wherein the abstract syntax tree structure comprises a plurality of program nodes and attribute information of each program node;

use each test case in the test case coverage information as an independent test node; and generate the graph-characterized structure based on the abstract syntax tree structure of each function, and a coverage relationship between each test node in the test case coverage information and each program node;

wherein the defect location module is specifically configured to:

convert the node attribute sequence into a vector sequence through an embedding layer in the graph neural network model and output the vector sequence to a graph neural network layer in the graph neural network model;

enable the graph neural network layer to obtain a state value of the program node and a state value of the test node based on the vector sequence and the adjacency matrix, and output them to an output layer in the graph neural network model; and enable the output layer to obtain the suspicious degree of each function in the target program based on the state value of the program node and the state value of the test node, and generate the suspicious degree list of each function in an order of suspicious degree from high to low.

5. The defect location device according to claim 4, wherein the model input generation module is specifically configured to:

generate the node attribute sequence based on the attribute information of the program node contained in the graph-characterized structure and the attribute information of the test node, wherein the attribute information of the test node is the attribute indicating that the test case passed the test or the attribute indicating that the test case failed the test; and generate the adjacency matrix based on the coverage relationship between the program node contained in the graph-characterized structure and the program node, and the coverage relationship between the program node and the test node.

6. The defect location device according to claim 4, wherein the graph neural network layer comprises a plurality of sub-layers; a first sub-layer of the graph neural network layer obtains the state value of the program node and the state value of the test node based on the vector sequence and the adjacency matrix, and starting from a second sub-layer, each sub-layer updates the state value of the program node and the state value of the test node based on the output of the previous sub-layer and the adjacency matrix.

* * * * *